(12) United States Patent
Aulich et al.

(10) Patent No.: US 8,152,988 B2
(45) Date of Patent: Apr. 10, 2012

(54) ELECTROCHEMICAL PROCESS FOR THE PREPARATION OF NITROGEN FERTILIZERS

(75) Inventors: Ted R. Aulich, Grand Forks, ND (US); Edwin S. Olson, Grand Forks, ND (US); Junhua Jiang, Grand Forks, ND (US)

(73) Assignee: Energy & Enviromental Research Center Foundation, Grand Forks, ND (US)

( * ) Notice: Subject to any disclaimer, the term of this patent is extended or adjusted under 35 U.S.C. 154(b) by 809 days.

(21) Appl. No.: 12/200,621

(22) Filed: Aug. 28, 2008

(65) Prior Publication Data
US 2009/0057161 A1    Mar. 5, 2009

Related U.S. Application Data

(60) Provisional application No. 60/969,341, filed on Aug. 31, 2007.

(51) Int. Cl.
*C25B 1/00* (2006.01)
*C25B 3/00* (2006.01)
*C25B 1/22* (2006.01)

(52) U.S. Cl. ......... 205/551; 205/436; 205/552; 205/553
(58) Field of Classification Search .................. 205/436, 205/551, 552, 553
See application file for complete search history.

(56) References Cited

U.S. PATENT DOCUMENTS

| | | | |
|---|---|---|---|
| 2,135,733 A * | 11/1938 | Richardson | 423/392 |
| 4,749,462 A | 6/1988 | Bachot et al. | |
| 5,736,016 A | 4/1998 | Allen | |
| 5,744,009 A * | 4/1998 | Singh et al. | 203/42 |
| 2002/0031694 A1* | 3/2002 | Van Berkel et al. | 429/30 |
| 2006/0049063 A1* | 3/2006 | Murphy et al. | 205/552 |
| 2007/0000788 A1 | 1/2007 | Koyama et al. | |
| 2011/0120880 A1* | 5/2011 | Jiang et al. | 205/436 |

FOREIGN PATENT DOCUMENTS

| | | | |
|---|---|---|---|
| GB | 2096124 A | * | 10/1982 |
| JP | 11347558 A | * | 12/1999 |

OTHER PUBLICATIONS

International Search Report, International Application No. PCT/US2008/074859, dated Apr. 15, 2009.

* cited by examiner

*Primary Examiner* — Edna Wong
(74) *Attorney, Agent, or Firm* — Conley Rose, P.C.; Rodney B. Carroll

(57) ABSTRACT

The present invention provides methods and apparatus for the preparation of nitrogen fertilizers including ammonium nitrate, urea, urea-ammonium nitrate, and/or ammonia, at low temperature and pressure, preferably at ambient temperature and pressure, utilizing a source of carbon, a source of nitrogen, and/or a source of hydrogen or hydrogen equivalent. Implementing an electrolyte serving as ionic charge carrier, (1) ammonium nitrate is produced via the reduction of a nitrogen source at the cathode and the oxidation of a nitrogen source at the anode; (2) urea or its isomers are produced via the simultaneous cathodic reduction of a carbon source and a nitrogen source; (3) ammonia is produced via the reduction of nitrogen source at the cathode and the oxidation of a hydrogen source or a hydrogen equivalent such as carbon monoxide or a mixture of carbon monoxide and hydrogen at the anode; and (4) urea-ammonium nitrate is produced via the simultaneous cathodic reduction of a carbon source and a nitrogen source, and anodic oxidation of a nitrogen source. The electrolyte can be aqueous, non-aqueous, or solid.

14 Claims, 12 Drawing Sheets

ELECTROCHEMICAL PROCESS FOR THE PREPARATION OF NITROGEN FERTILIZERS

CROSS-REFERENCE TO RELATED APPLICATIONS

This application claims the benefit under 35 U.S.C. §119(e) of U.S. Provisional Patent Application No. 60/969,341 entitled "Electrochemical Process for the Preparation of Nitrogen Fertilizers," filed Aug. 31, 2007, the disclosure of which is hereby incorporated herein by reference.

STATEMENT REGARDING FEDERALLY SPONSORED RESEARCH OR DEVELOPMENT

This invention was made with U.S. Government support under Contract No. DE-FC36-03GO13055 awarded by the U.S. Department of Energy, and Contract Nos. 2003-38819-02014, 2004-38819-02182, 2005-38819-02311, and 2006-38819-03470 awarded by the U.S. Department of Agriculture. The Government has certain rights in this invention.

BACKGROUND OF THE INVENTION

1. Field of the Invention

This invention relates to an electrochemical method and apparatus for the synthesis of nitrogen fertilizers including ammonium nitrate, urea, ammonia, and urea-ammonium nitrate. In particular, the invention relates to an apparatus and method whereby (1) a nitrogen source is utilized to produce ammonium nitrate; (2) a nitrogen source and a carbon source are reacted using liquid electrolyte at low temperature or solid electrolyte at high temperature to form urea; (3) a nitrogen source and a hydrogen-equivalent source are reacted to generate ammonia; and (4) a nitrogen source and carbon source are reacted to produce urea-ammonium nitrate.

2. Background of the Invention

Ammonium nitrate (AN, 34% N), urea (46% N), ammonia (82% N) and urea-ammonium nitrate (UAN, 28%~32% N) are widely used high nitrogen-content fertilizers. Methods for industrial production of these fertilizers are mainly based on the Haber process, which involves the heterogeneous reaction of nitrogen and hydrogen on an iron-based catalyst at high pressure (for example, 200-300 bar) and high temperature (for example, 430° C.-480° C.) to produce ammonia as follows:

$$N_2(g)+3H_2(g) \leftrightarrow 2NH_3(g) \quad \text{(Rea. 1)}$$

The conversion to ammonia, shown in Reaction 1, is limited by thermodynamics. The gas volume decreases as the reaction progresses. Hence, very high pressure must be used to drive the ammonia synthesis reaction to the right in Reaction 1, which is in the direction of ammonia gas. Carrying out ammonia synthesis at very high pressure is also necessary to prevent decomposition of synthesized ammonia into nitrogen and hydrogen and to provide practical reaction rates. In addition, Reaction 1 is exothermic, and ammonia formation increases with decreasing temperature. Reducing the temperature, however, undesirably reduces the rate of the reaction. Therefore, an intermediate temperature is selected such that the reaction proceeds at a reasonable rate, but the temperature is not so high as to drive the reverse reaction. The equilibrium conversion of hydrogen gas and nitrogen gas to ammonia is generally only on the order of 10%~15%. Low conversion efficiencies give rise to cost-intensive, large-scale chemical plants and costly operating conditions required to commercially produce hundreds to thousands of tons per day of ammonia in an ammonia synthesis plant.

Ammonium nitrate (AN) is produced via the acid-base reaction of ammonia with nitric acid according to the equation:

$$NH_3+HNO_3 \rightarrow NH_4NO_3 \quad \text{(Rea. 2)}$$

Industrial nitric acid is manufactured by the high-temperature catalytic oxidation of ammonia. This process typically consists of three steps: first, ammonia is reacted with air on PtIr alloy catalyst at around 750°~800° C. to form nitric oxide according to the following reaction:

$$4NH_3+5O_2 \rightarrow 4NO+6H_2O \quad \text{(Rea. 3)}$$

Next, nitric oxide is oxidized to nitrogen dioxide and its liquid dimer as follows:

$$2NO+O_2 \rightarrow 2NO_2 \leftrightarrow N_2O_4. \quad \text{(Rea 4)}$$

And, finally, the nitrogen dioxide/dimer mixture is introduced into an absorption process using water in accordance with the following reaction:

$$3NO_2+H_2O \rightarrow 2HNO_3+NO \quad \text{(Rea. 5)}$$

In the first step, the oxidation of ammonia to nitric oxide proceeds in an exothermic reaction with a range of 93% to 98% yield. Reaction temperatures can vary from 750° C. to 900° C. Higher temperatures increase reaction selectivity toward NO production. Reaction 3 is favored by low pressures. In the second step, Reaction 4 is slow and highly temperature- and pressure-dependent. Operating at low temperatures and high pressures promotes maximum production of $NO_2$ within a minimum reaction time. The final step, Reaction 5, is exothermic, and continuous cooling is therefore required within the absorber. As the conversion of NO to $NO_2$ is favored by low temperature, this reaction will take place significantly until the gases leave the adsorption column.

The commercial production of urea is based on the reaction of carbon dioxide and ammonia at high pressure (for example 140 bar) and high temperature (for example 180°~185° C.) to form ammonium carbamate (Reaction 6), which is subsequently dehydrated into urea and water (Reaction 7):

$$2NH_3+CO_2 \rightarrow NH_2COONH_4 \quad \text{(Rea. 6)}$$

$$NH_2COONH_4 \rightarrow NH_2CONH_2+H_2O \quad \text{(Rea. 7)}$$

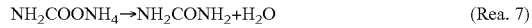

Reaction 6 is fast and highly exothermic and goes essentially to completion under normal processing conditions, while Reaction 7 is slow and endothermic and usually does not reach thermodynamic equilibrium under processing conditions. The degree to which Reaction 7 proceeds depends on, among other factors, the temperature and the amount of excess ammonia used. Increasing temperature and the $NH_3$:$CO_2$ ratio could increase the conversion of $CO_2$ to urea.

Different urea production technologies basically differ on how urea is separated from the reactants and how ammonia and carbon dioxide are cycled. Refinements in the production technology are usually concentrated on increasing $CO_2$ conversion, optimizing heat recovery, reducing utility consumption, and recovering residual $NH_3$ and urea from plant effluents.

Ammonium nitrate and urea are used as feedstocks in the production of urea-ammonium nitrate (UAN) liquid fertilizers. Most UAN solutions typically contain 28%, 30% or 32% N, but other customized concentrations (including additional nutrients) are produced. The addition of corrosion inhibitors or the use of corrosion-resistant coatings allows carbon steel to be used for storage and transportation equipment for the solutions.

Continuous and batch-type processes are used, and, in both processes, concentrated urea and ammonium nitrate solutions are measured, mixed, and then cooled. In the continuous process, the ingredients of the UAN solution are continuously fed to and mixed in a series of appropriately sized static mixers. Raw material flow as well as finished product flow, pH, and density are continuously measured and adjusted. The finished product is cooled and transferred to a storage tank for distribution. In the batch process, the raw materials are sequentially fed to a mixing vessel fitted with an agitator and mounted on load cells. The dissolving of the solid raw material(s) can be enhanced by recirculation and heat exchange as required. The pH of the UAN product is adjusted prior to the addition of the corrosion inhibitor.

As described above, the production of high-nitrogen fertilizers involves multi step reactions and is strongly limited by the Haber process. The equilibrium conversion of hydrogen gas and nitrogen gas to ammonia in the Haber process is generally only on the order of 10%~15%. Such low conversion efficiencies give rise to cost-intensive, large-scale chemical plants and costly operating conditions required to commercially produce hundreds to thousands of tons per day of ammonia in an ammonia synthesis plant. Therefore, it is of industrial interest to develop simplified approaches for the production of high-nitrogen fertilizers, especially at small to middle scales. A one-step process can convert carbon sources, nitrogen sources, and/or hydrogen sources to the high-nitrogen fertilizer at decreased pressure and/or temperature has the potential to meet such requirements of small- to middle-scale production of high-nitrogen fertilizers.

Only recently has the feasibility of using electrochemical processes for urea synthesis been investigated. The most obvious advantages of electrochemical processes over traditional processes mentioned above include (1) simplified process complexity since a one-step process is likely, (2) simplified operation conditions since electrochemical reaction could be run even at room temperature and atmospheric pressure, and (3) decreased system volume and size. Several challenges exist, however, for industrial consideration of the reported electrochemical process for the preparation of urea. One of these challenges is the high cost of the nitrogen source, as nitrite and nitrate are typically employed. Another of these challenges is the high cost of the hydrogen source, as more hydrogen gas is required because of the use of above-mentioned nitrite or nitrate compared to the use of a low-valance nitrogen source such as nitrogen gas or nitric oxide. Commercialization of the process is also deterred by the fact that the current efficiency for urea formation has been low and the process has not been optimized. The process involves the reduction of carbon dioxide and nitrogen-containing compounds. The two reactions corresponding to (1) electrochemical reduction of $CO_2$ and (2) electrochemical reduction of nitrogen-containing compounds are thermodynamically and kinetically different. To promote urea formation, the rates of these two reactions must be precisely controlled, and this requires developing electrocatalysts, selecting electrolytes, controlling the composition of the reactants and the feeding rates of the reactants and electrolytes, choosing current or potential control mode, and implementing temperature control. Additionally, the structures of the electrodes and the electrochemical cells need to be optimized to improve process efficiency and decrease process complexity. Finally, for commercial production, stacks comprising several electrochemical cell units must be designed, and control systems for these stacks need to be developed.

Recently, attention has been drawn to the removal of $CO_2$ and nitrogen oxides from the environment, as it is conjectured that these compounds contribute to serious problems, including the "greenhouse effect" and acid rain.

The present invention includes electrochemical processes for the production of nitrogen fertilizers including ammonium nitrate, urea, ammonia, and urea-ammonium nitrate, using cost-effective sources of carbon and hydrogen or hydrogen equivalent such as carbon monoxide. One embodiment of the present invention is a low-temperature and low pressure electrochemical process for the production of a nitrogen fertilizer without the need for a hydrogen input. Another embodiment is an electrochemical process for urea production using a cost-effective nitrogen source, carbon sources and a low-cost hydrogen equivalent rather than high-purity hydrogen as required for the Haber and other processes. Another embodiment is an electrochemical process for ammonia production using a cost-effective nitrogen source and a low-cost hydrogen equivalent. Another embodiment is an electrochemical process for the production of urea-ammonium nitrate using cost-effective sources of nitrogen and carbon. Another embodiment utilizes greenhouse gases in the electrochemical process for the production of nitrogen fertilizers. The present invention also encompasses electrochemical reactors and reactor components developed specifically for the above-described embodiments.

BRIEF SUMMARY

The present invention encompasses methods and apparatuses for the preparation of nitrogen fertilizers at low temperature and/or pressure, preferably at ambient temperature and pressure, utilizing a source of nitrogen, a source of carbon, a source of hydrogen or hydrogen equivalent, and electricity. Implementing an electrolyte serving as ionic charge carrier, (1) ammonium nitrate is produced via the reduction of a nitrogen source at the cathode and the oxidation of a nitrogen source at the anode; (2) urea or isomers of urea are produced via the simultaneous cathodic reduction of a carbon source and a nitrogen source; (3) ammonia is produced via the hydrogenation of a nitrogen source using a cost-effective hydrogen or hydrogen equivalent source; and (4) urea-ammonium nitrate is produced via the simultaneous cathodic reduction of a carbon source and a nitrogen source, and anodic oxidation of a nitrogen source.

The source of nitrogen may be a nitrogen-containing compound in the electrolyte, a nitrogen-containing gas supplied to the cathode side, or a combination thereof. The source of carbon may be a carbon-containing compound in the electrolyte, a carbon-containing gas supplied to the cathode, or a combination thereof. Similarly, the source of hydrogen may be hydrogen-containing compound in the electrolyte, a hydrogen- or carbon monoxide-containing gas supplied to the anode side, or a combination thereof. Accordingly, there are various combinations of sources for nitrogen and carbon in combination with one or more sources of hydrogen or hydrogen equivalent such as carbon monoxide. The electrolyte can be aqueous, nonaqueous, or solid.

Herein disclosed is a method for producing nitrogen fertilizers selected from the group consisting of ammonium nitrate, urea, ammonia, urea-ammonium nitrate and combinations thereof, the method comprising: providing at least one reactor comprising at least one reaction chamber and at least one anode and at least one cathode; placing at least one electrolyte between each at least one anode and each at least one cathode; feeding gaseous or liquid reactants selected from nitrogen sources, carbon sources, hydrogen or hydrogen equivalent sources, and combinations thereof to the reactor; and providing electricity to drive anodic and cathodic reactions, thereby producing ammonium nitrate by providing a nitrogen source to at least one cathode and a nitrogen source to at least anode; urea by providing a carbon source and/or a nitrogen source to at least one cathode, and a hydrogen source to at least one anode; ammonia by providing a nitrogen source to at least one cathode, and a hydrogen or hydrogen equivalent source to at least one anode; urea-ammonium nitrate by providing a nitrogen source and a carbon source to at least one cathode, and a nitrogen source to at least one anode; or a combination thereof.

The carbon source may be selected from the group consisting of carbon dioxide, carbon-containing organic compounds, carbon-containing gases, and combinations thereof. In specific embodiments, the carbon source is a carbon-containing gas. In embodiments, the carbon-containing gas comprises carbon dioxide which may be from an ethanol plant, a fermentation plant, a coal combustion system, a gasification, an adsorption system, a scrubbing system, the Selexol process, the Rectisol process, an amine system, the reforming of natural gas, or a combination thereof.

The nitrogen source may be selected from the group consisting of nitrogen-containing salts, nitrogen-containing gases, and combinations thereof wherein the nitrogen-containing gases include nitrogen oxide with a chemical formula $N_xO_y$, where x=1 or 2, and y=0, 1, 2, 3, 4, 5. In embodiments, the nitrogen source is a liquid form of nitrogen oxide captured using a solution of metal complexes. In embodiments, the nitrogen oxide comes from a coal combustion plant, a gasification process, an electric discharge of air process, or a combination thereof.

The source of hydrogen may be selected from the group consisting of hydrogen-containing salts, hydrogen-containing compounds, and hydrogen-containing gases. A source of hydrogen equivalent can be carbon monoxide or a mixture of carbon monoxide and hydrogen. In embodiments, the hydrogen source comprises a hydrogen-containing salt selected from the group consisting of ammonium hydroxide ($NH_4OH$) and sodium borohydride ($NaBH_4$). In embodiments, the hydrogen source comprises a hydrogen-containing gas selected from the group consisting of $H_2$ and $NH_3$. In some embodiments, the hydrogen source comprises a hydrogen-containing compound selected from the group consisting of water, alcohols, and sugars. In embodiments, the hydrogen source comprises hydrogen gas from the electrolysis of a hydrogen containing compound, wherein the electrolysis is performed utilizing electricity from wind energy, solar energy, or a combination thereof and the electrolysis of water takes place in the presence of depolarizers such as coal, sulfur, and sulfur dioxide to produce hydrogen. In some embodiments, the hydrogen gas or hydrogen equivalent comes from a coal gasification process, a biomass gasification process, the reforming of natural gas, or a combination thereof.

In embodiments of the method, the at least one electrolyte is selected from the group consisting of aqueous electrolytes comprising aqueous solution, nonaqueous electrolytes, and solid electrolytes. In embodiments comprising aqueous electrolyte, the aqueous solution may be selected from the group consisting of inorganic acids, alkaline or neutral salts dissolved in water, alkaline or neutral salts dissolved in a mixture of water and at least one organic solvent, and combinations thereof. In embodiments, the reactor comprises at least one nonaqueous electrolyte selected from the group consisting of organic salt dissolved in an organic solvent, a molten acid, alkaline and salt, an ionic liquid, or combinations thereof. In embodiments, the reactor comprises at least one solid electrolyte selected from the group consisting of polymer electrolytes, inorganic solid electrolytes, and combinations thereof. In some embodiments, the at least one solid electrolyte is selected from the group consisting of inorganic proton conductors, inorganic oxygen-ion conductors, and combinations thereof.

In embodiments, anodic and cathodic reactions are carried out at a temperature in the range of from about 0° C. to about 1000° C. In certain embodiments, the electrochemical reactions are carried out at a temperature in the range of from about 0° C. to about 100° C., and at least one electrolyte is liquid electrolyte. In specific embodiments, the electrochemical reactions are carried out at a temperature lower than 200° C. and at least one electrolyte is selected from the group consisting of solid polymer electrolytes. In alternative embodiments, the electrochemical reactions are carried out at a temperature in the range of from about 200° C. to about 600° C. and at least one electrolyte is selected from the group consisting of inorganic proton conductors. In other embodiments of the disclosed method, electrochemical reactions are carried out at a temperature greater than a temperature in the range of from 600° C. to about 1000° C. and at least one electrolyte is selected from the group consisting of inorganic oxygen-ion conductors.

In some embodiments, the anodic and cathodic reactions are carried out at a pressure in the range of from about between 1 atmosphere to about 200 atmospheres.

In some embodiments, feeding at least one gaseous reactant occurs at a rate of from about 0 SCCM to about 10,000 SCCM. In some embodiments, feeding at least one liquid reactant or feeding at least one electrolyte occurs at a rate of from about 0 mL/min to about 10,000 mL/min.

In some embodiments of the method, the reactants comprise at least one carbon source and at least one nitrogen source, and the molar ratio of the carbon source to the nitrogen source in the reactants changes from 0.1 to 20 during the electrochemical reaction.

At least one anode may comprise at least one catalyst selected from the group consisting of precious metals, alloys of precious metals, supported counterparts thereof, and combinations thereof. At least one cathode may comprise at least one catalyst selected from the group consisting of unsupported transition metals, supported transition metals, alloys thereof, organic macromolecular compounds, conductive polymers, and combinations thereof.

In embodiments, the reactor is an electrochemical reactor. The electrochemical reactor may comprise one chamber that contains the reactants, the electrolyte, and the electrodes. Alternatively, the electrochemical reactor may comprise one gas chamber and one liquid chamber and one porous electrode or two porous electrodes. In still other embodiments, the electrochemical reactor may comprise three chambers selected from the group consisting of two gas chambers and one liquid chamber, one gas chamber and two liquid chambers, and other combinations of three chambers. In some embodiments, the electrochemical reactor comprises more than three chambers selected from the group consisting of two gas chambers and two liquid chambers or two gas chambers and three liquid chambers.

In embodiments, the electrochemical reactor comprises one gas chamber and one liquid chamber, and the reactor further comprises at least one gas diffusion electrode separating the gas chamber and the liquid chamber.

The electrochemical reactor may comprise no liquid chamber and at least one electrolyte selected from the group consisting of solid electrolytes. In embodiments, a cathode layer of the cathode, an anode layer of the anode, or both are porous, and the reactants are gaseous.

In some embodiments wherein the reactor comprises three or more chambers, the reactor further comprises a membrane separating the at least one anode and the at least one cathode. The membrane may be selected from the group consisting of ion-exchange membranes, porous polymer membranes, inorganic porous membranes, and combinations thereof.

In some embodiments, the method comprises at least two reactors forming a stack. In these embodiments, the two or more reactors may be connected in series, connected in parallel or, in the case of three or more reactors, any combination thereof.

In embodiments, the at least one electrolyte is liquid, ammonium nitrate is produced, and the method further comprises neutralizing excess nitric acid produced in the reactor by reaction with ammonia in an external neutralization tank. In some embodiments, ammonium nitrate is produced via the reaction of ammonia produced at the cathode and nitric acid produced at the anode outside the reactor. In embodiments, ammonium nitrate is produced, and the at least one electrolyte is liquid electrolyte. In certain embodiments, ammonium nitrate is produced in the reactor and the at least one electrolyte is solid electrolyte.

In embodiments, the method further comprises reacting ammonia and nitric acid in a reaction tank connected to the reactor. In embodiments, the method further comprises converting, in an absorption tower, oxides of nitrogen with high valance into nitric acid by contacting the oxides with water.

In embodiments, urea is produced and the method comprises providing a carbon source and a nitrogen source to at least one cathode, feeding a hydrogen or hydrogen equivalent source to at least one anode, and placing at least one liquid electrolyte between at least one cathode and at least one anode. In alternative embodiments, urea is produced, the at least one electrolyte is solid, and the reactor is a high temperature electrochemical cell.

In some embodiments, the method further comprises using a cold trap to capture urea or an isomer of urea.

In embodiments, ammonia is produced and the method comprises providing a nitrogen source to at least one cathode, feeding a hydrogen or hydrogen equivalent source to at least one anode, and placing at least one electrolyte between at least one cathode and at least one anode.

In some embodiments, urea-ammonium nitrate is produced, the reactor is an electrochemical cell; the at least one electrolyte is solid; a mixture of urea and ammonia is produced at the at least one cathode; nitrogen dioxide generated at the at least one anode is converted into nitric acid with water; and urea, ammonia, and nitric acid are reacted to form urea-ammonia nitrate.

In embodiments, the anodic and cathodic reactions are carried out at a constant current mode, a constant potential mode, a current-pulse mode, or a potential-scanning mode.

The foregoing has outlined rather broadly the features and technical advantages of the present disclosure in order that the detailed description that follows may be better understood. Additional features and advantages of the apparatus and method will be described hereinafter that form the subject of the claims of this disclosure. It should be appreciated by those skilled in the art that the conception and the specific embodiments disclosed may be readily utilized as a basis for modifying or designing other structures for carrying out the same purposes of the present disclosure. It should also be realized by those skilled in the art that such equivalent constructions do not depart from the spirit and scope of the apparatus and method as set forth in the appended claims.

BRIEF DESCRIPTION OF THE DRAWINGS

For a detailed description of the preferred embodiments of the apparatus and methods of utilizing this apparatus for the production of nitrogen fertilizers, reference will now be made to the accompanying drawings in which.

The same numbers are used throughout the drawings to refer to the same/similar components of the apparatus.

DETAILED DESCRIPTION

I. Overview

Figure 1:
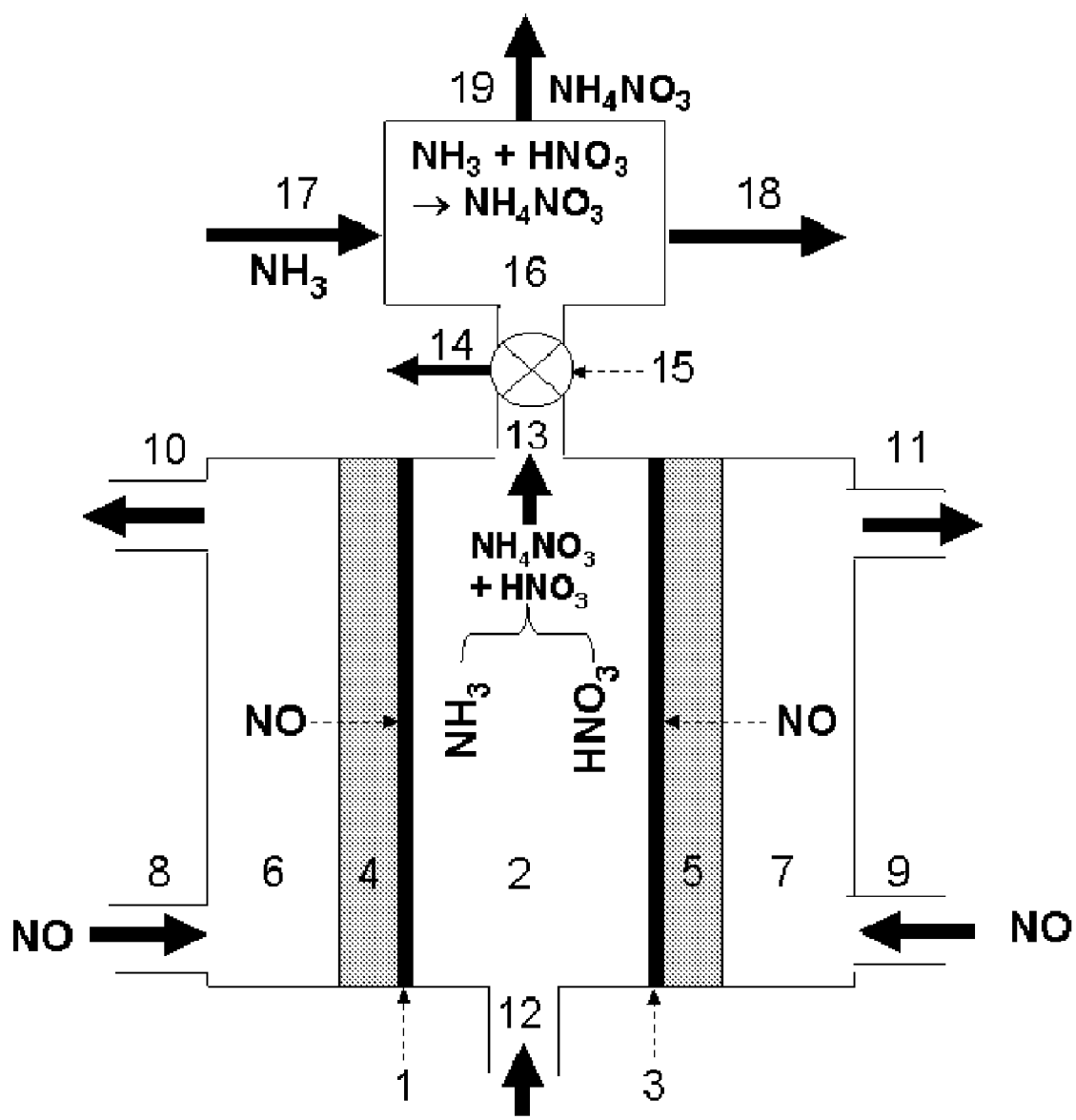
FIG. 1 schematically shows an installation for the electrochemical production of ammonium nitrate from a gaseous nitrogen source, comprising an electrochemical cell without membrane separator and a reaction tank for the neutralization of excess nitric acid using ammonia according to one embodiment of the present disclosure.

Herein disclosed are an economical apparatus and method for the production of nitrogen fertilizers. The apparatus comprises at least one anode and at least one cathode, wherein reactants selected from nitrogen sources, carbon sources, hydrogen or hydrogen equivalent sources and combinations thereof are converted into nitrogen fertilizers. In embodiments, the apparatus comprises an electrochemical reactor. In embodiments, the electrochemical reactor comprises a gas flow field. Alternative embodiments comprise a liquid chamber.

In embodiments, the electrochemical reactor comprises at least one cathode, one anode, and one electrolyte component. For improved control and utilization of gaseous sources involved in the synthesis reaction of nitrogen fertilizers, in embodiments, the electrochemical reactor comprises at least a gas flow field and one gas diffusion electrode. For the control of liquid components including reactant sources and/or electrolyte which are involved in the nitrogen fertilizers synthesis, in embodiments, the electrochemical reactor comprises a liquid chamber to allow the liquid components to flow through the gap between the cathode and anode.

In embodiments, the nitrogen fertilizer production method herein disclosed is economically desirable compared to conventional nitrogen fertilizers production methods. In embodiments of the apparatus, the carbon source, the nitrogen source, the hydrogen or hydrogen equivalent source, or a combination thereof is chosen based on availability and economic advantage. In preferred embodiments, the nitrogen source comprises nitrogen oxide, and utilization of this nitrogen oxide for the production of nitrogen fertilizers may remove this potentially harmful compound from the environment. Reduction of energy consumption and improvement of the current efficiency and the selectivity for the nitrogen fertilizers formation are achieved by optimization of the nitrogen fertilizers production process. Optimization of the process includes any combination of: (1) the use of efficient electrocatalysts, (2) the selection of suitable electrolytes, (3) the control of the composition of the reactants and the feeding rates of the reactants and the electrolytes, (4) the selection of current or potential control mode, (5) the implementation of temperature control and (6) the optimization of the structure of the electrode and the electrochemical reactor.

In embodiments, additional economic advantages are realized through the incorporation of a coupled anode process that provides value-added product thus improving the economy of the nitrogen fertilizers production process. In embodiments, discussed in more detail herein below, the anode reactant provides hydrogen-containing or hydrogen equivalent species at the anode-electrolyte interface and is oxidized to add value to the product. This added value at the anode side may partially or fully offset the energy cost of the nitrogen fertilizer production process.

Description of Electrochemical Process

In embodiments, nitrogen fertilizers are produced from a source of nitrogen, a source of carbon, and/or a source of hydrogen utilizing electrochemical methods.

In one embodiment, ammonium nitrate is produced in aqueous solution at low temperature and atmospheric pressure utilizing a single nitrogen source without the need of hydrogen gas. At the cathode side, a nitrogen source is electrochemically reduced to ammonia. At the anode side, a nitrogen source is electrochemically oxidized into nitric acid. Reacting ammonia and nitric acid inside or outside of the electrochemical cell results in the formation of ammonium nitrate. Excess of nitric acid can be neutralized in an additional reaction tank with ammonia to generate ammonium nitrate. Both gaseous and liquid nitrogen sources can be used in the electrochemical process of ammonium nitrate. Preferably, the nitrogen source is gaseous nitrogen oxide recovered from a combustion process of coals, a gasification process of coals or biomass, or their corresponding form captured with liquid absorbents. Typically, employing NO as the nitrogen source at both anode side and cathode side can produce ammonium nitrate according to the following reaction:

$$8NO + 7H_2O \rightarrow 3NH_4NO_3 + 2HNO_3 \qquad \text{(Rea. 8)}$$

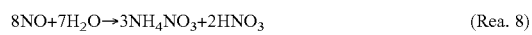

Excess of nitric acid produced at the anode side will be reacted with added ammonia to form ammonium nitrate. Alternatively, the liquid form of NO captured by complexes of iron(II) is a suitable nitrogen source used for the formation of ammonia at the cathode. Similarly, greenhouse gas nitrous oxide could be used to produce ammonium nitrate as follows:

$$2N_2O + 4H_2O \rightarrow 2NH_4NO_3 \qquad \text{(Rea. 9)}$$

In Reaction 9, no additional ammonia is required for the production of ammonium nitrate.

In another embodiment, ammonium nitrate can be produced from a nitrogen source in an electrochemical cell based on solid electrolyte, preferably, an oxygen-ion conductor. At the cathode, a nitrogen source may be reduced into ammonia. At the anode, a nitrogen source can be oxidized into the oxides of nitrogen(IV) or (V) which can be adsorbed with water to produce nitric acid. Ammonia and nitric acid are then introduced into a reaction tank to produce ammonium nitrate. The approach of using solid electrolyte may enable the production of ammonium nitrate of high concentration without the need of extensive water evaporation.

In another embodiment, urea is produced from a nitrogen source, a carbon source and a hydrogen or hydrogen equivalent source in liquid electrolyte at low temperature and low pressure. A gaseous nitrogen source and a gaseous carbon source are co-fed at a controlled ratio to the cathode gas chamber, while a gaseous hydrogen or hydrogen equivalent source is fed to the anode gas chamber. Alternatively, a liquid nitrogen source is used together with a gaseous carbon source and a gaseous hydrogen or hydrogen equivalent source. Preferably, greenhouse gases emitted from power plants, gasification processes or ethanol plants are used as a nitrogen source and a carbon source respectively. As an example, nitric oxide and carbon dioxide from power plants are utilized to produce urea in one step with the addition of hydrogen as follows:

$$CO_2 + 2NO + 5H_2 \rightarrow CO(NH_2)_2 + 3H_2O \qquad \text{(Rea. 10)}$$

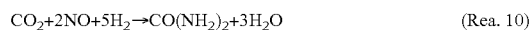

In another embodiment related to the production of urea, solid urea or its isomer can be produced in a solid-state electrochemical cell based on solid electrolytes. Both nitrogen gas recovered from air and other nitrogen sources can be used for the high temperature process. The use of nitrogen gas as a nitrogen source requires high reaction temperature, which is comprised by the stability of urea or its isomer product and the reaction rate. A reaction temperature of 300°-600° C. is preferred at atmospheric pressure. The use of a gaseous nitrogen oxide could allow the reaction to be operated at temperatures lower than 350° C. In an electrochemical cell using solid electrolyte, urea may be produced from nitrogen gas in a single step according to the following reaction:

$$CO_2+N_2+3H_2 \rightarrow CO(NH_2)_2+H_2O \quad \text{(Rea. 11)}$$

Such a one-step urea process which can be operated at atmospheric pressure has obvious advantages over traditional urea process requiring two high-pressure reactions (Reactions 1 and 6) in terms of process complexity, operating cost, and system complexity. High-purity urea can be produced without the need of costly purification. Similarly, high-purity urea can be generated using a gaseous nitrogen source through a reaction such as Reaction 10.

In another embodiment, ammonia can be produced in a solid-state electrochemical cell using a hydrogen equivalent such as carbon monoxide or a mixture of hydrogen and carbon monoxide in place of high purity hydrogen. At the anode side, humidified carbon monoxide (CO) or a humidified mixture of $H_2$ and CO is fed to the porous anode layer and is simultaneously oxidized at the anode layer and electrolyte layer interface. At the cathode side, $N_2$ is fed to the porous cathode layer and is electrochemically hydrogenated to yield ammonia ($NH_3$). Because of the direct use of CO or a CO—$H_2$ mixture rather than high purity hydrogen, the fertilizer cost and the process complexity could be significantly reduced.

In yet another embodiment, urea-ammonium nitrate is produced via the cathodic reduction of a nitrogen source and a carbon source to form urea and ammonia and anodic oxidation of a nitrogen source to generate nitric acid. Resulting cathodic products urea and ammonia and anodic product nitric acid are introduced into a reaction tank to generate the mixture of urea and ammonium nitrate with ammonia neutralizing excess nitric acid.

In another embodiment related to the production of urea-ammonium nitrate, nitrogen compounds including urea, ammonia, and the oxides of nitrogen are formed using an electrochemical cell based on solid electrolytes. The oxides of nitrogen such as $NO_2$ and $N_2O_5$ are converted into nitric acid in an absorption tower using water. The urea-ammonium nitrate is then produced in a reaction tank by mixing ammonia, urea, and nitric acid under controlled pH using ammonium.

Description of the Process Installation

In order to describe the apparatus and method of the present disclosure, reference will now be made to FIGS. 1 through 12, which depict various configurations that may be selected depending on which nitrogen fertilizer is produced and what feedstocks are used. The apparatus and methods herein disclosed are not, however, limited to the embodiments of FIGS. 1 through 12. The nitrogen fertilizers production method of the present disclosure comprises providing an electrolyte positioned between cathode 1 and anode 3, providing a source of carbon, a source of nitrogen, and/or a source of hydrogen or hydrogen equivalent from which hydrogen-containing species are formed, and providing a source of electricity to drive reaction(s) at the electrode(s) whereby the nitrogen fertilizers are produced.

Generally, electrolytic cells without a membrane separator comprise a vessel in which electrolysis takes place, the vessel having an inlet 12 and an outlet 13. A liquid electrolyte prepared by dissolving ion-conductive compounds in water or other solvent is contained in the liquid chamber 2 of the vessel and positioned between a cathode 1 and an anode 3. Activation of the electrolytic cell occurs when an electric potential is applied across the electrodes and causes a chemical reaction to occur between the ions in solution and the electrode(s).

In one embodiment shown in FIG. 1, the electrolytic cell used for the production of ammonium nitrate at low temperature and pressure comprises two gas chambers, a cathode gas chamber 6 and an anode gas chamber 7, and one liquid electrolyte chamber 2. Cathode gas chamber 6 has a cathode gas inlet 8 and a cathode gas outlet 10, while anode gas chamber 7 has corresponding gas inlet 9 and gas outlet 11. Electrolyte chamber 2 has a liquid electrolyte inlet 12 and a liquid electrolyte outlet 13. At the cathode side, gas diffusion layer 4 provides reactants access to the cathode/electrolyte interface for a cathode reaction; while at the anode side, corresponding anode gas diffusion layer 5 is prepared for the anode reaction of gaseous anode reactants. By the use of selective anode and cathode electrocatalysts, ammonia and nitric acid are produced at the cathode and anode, respectively. The ammonia and nitric acid can then react within the liquid chamber to produce ammonium nitrate before the liquid phase flows through a multichannel valve 15. Ammonium nitrate and excess of nitric acid produced in the liquid phase enter a reaction tank 16 where the excess of nitric acid is neutralized into ammonium nitrate using ammonia added through a channel 17. The liquid phase is cycled back into the liquid chamber 2 through an electrolyte-recycling channel 14 when the concentration of ammonium nitrate is low in the liquid phase. Ammonium nitrate product could be captured through the product outlet 19, and remaining liquid phase will be cycled through a channel 18 if needed.

Figure 2:
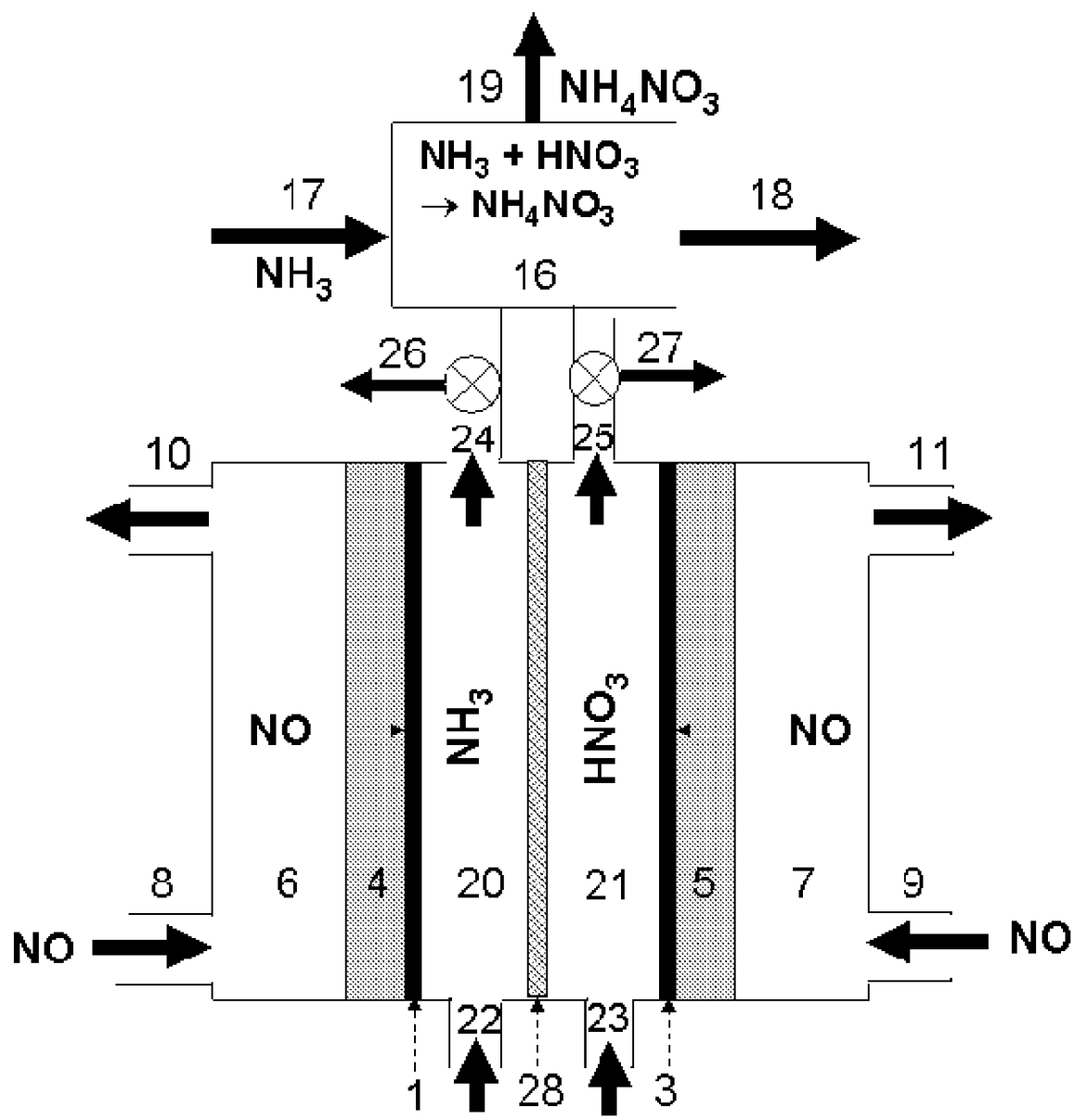
FIG. 2 schematically shows an installation for the electrochemical production of ammonium nitrate from gaseous nitrogen source, which comprises an electrochemical cell with membrane separator and a reaction tank for the neutralization of excess nitric acid using ammonia according to another embodiment of the present disclosure.

In another embodiment shown in FIG. 2, the electrolytic cell with a membrane separator used for the production of ammonium nitrate at low temperature and pressure comprises two gas chambers, a cathode gas chamber 6 and an anode gas chamber 7, and two liquid electrolyte chambers: cathode electrolyte chamber 20 and anode chamber 21, which are separated by a membrane separator 28. The introduction of the membrane separator could allow the use of two different electrolytes for cathode and anode processes, respectively. Cathode electrolyte chamber 20 has a liquid electrolyte inlet 22 and a liquid electrolyte outlet 24, and anode electrolyte chamber 21 has a liquid electrolyte inlet 23 and a liquid electrolyte outlet 25. In the membrane electrochemical cell, ammonia is produced at the cathode, and nitric acid is produced at the anode. There is no neutralization of ammonia and nitric acid in the electrochemical cell. All neutralization occurs inside the reaction tank 16 with the addition of ammonia. Cathode electrolyte phase and anode electrolyte phase are cycled back into the electrochemical cell through a cathode electrolyte channel 26 and an anode electrolyte channel 27, respectively.

Figure 3:
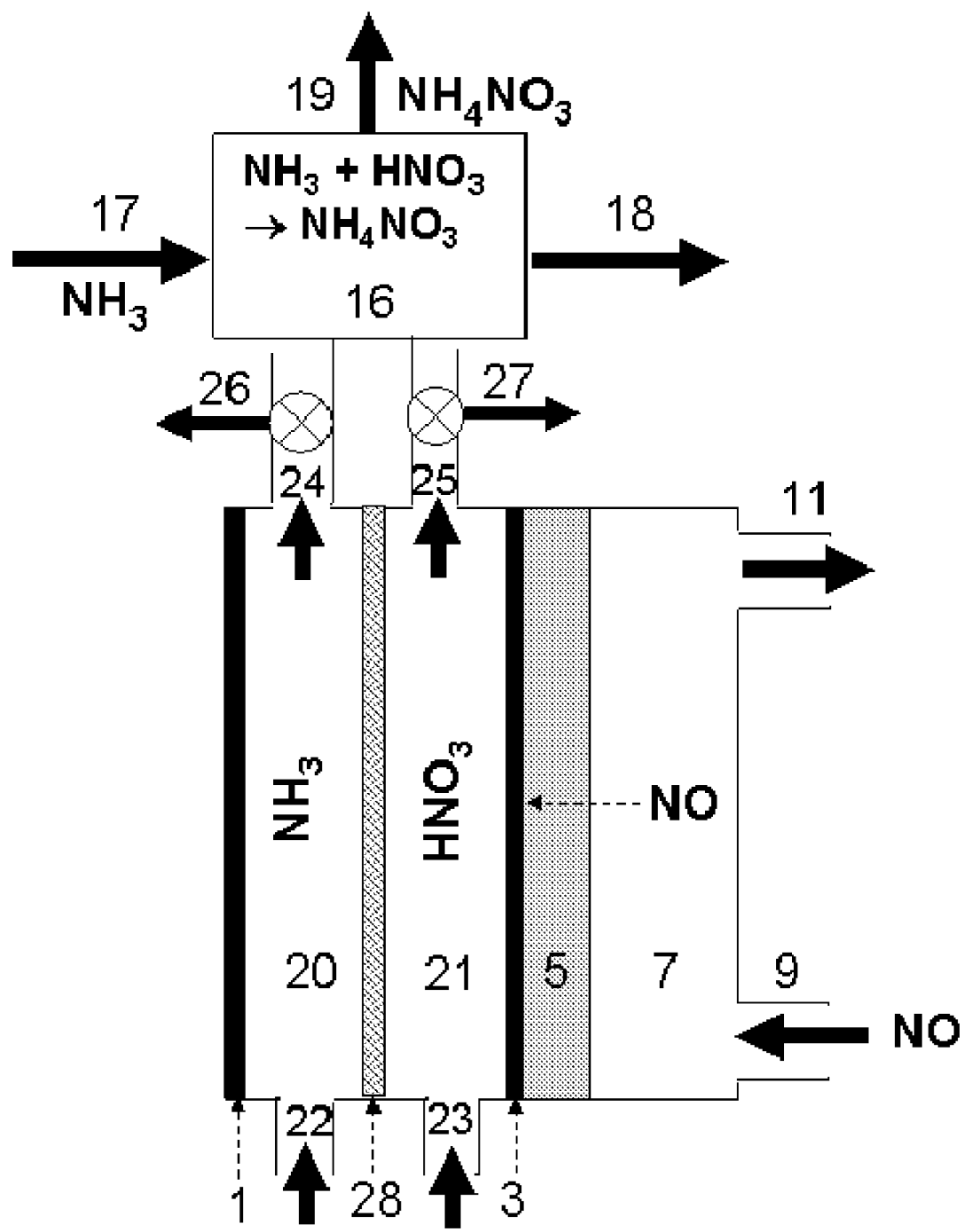
FIG. 3 schematically shows an installation for the electrochemical production of ammonium nitrate from a liquid nitrogen source, which comprises an electrochemical cell with membrane separator and a reaction tank for the neutralization of excess nitric acid using ammonia according to another embodiment of the present disclosure.

In the embodiment shown in FIG. 3, the use of a liquid nitrogen source at the cathode side for the production of ammonium nitrate is used to obviate the need of a cathode gas chamber 6 with inlet 8 and outlet 10 and a gas diffusion layer 4.

Figure 4:
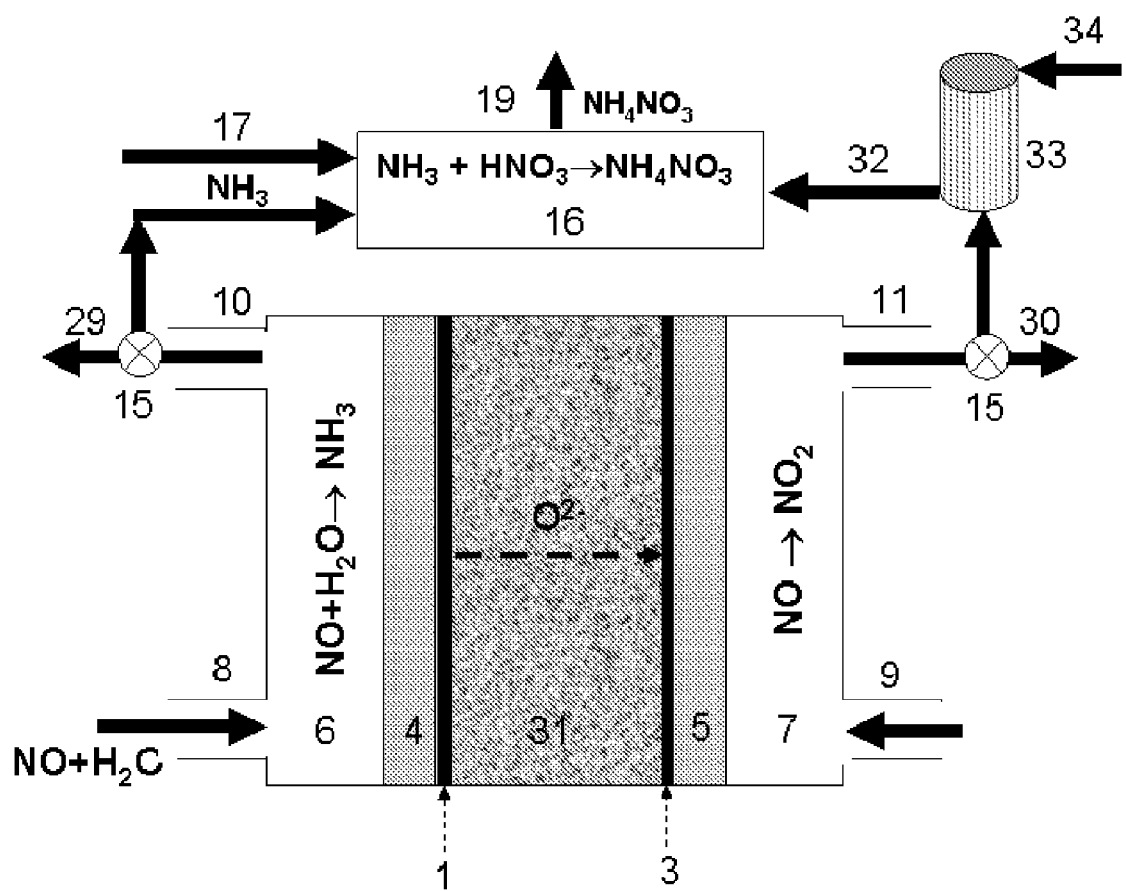
FIG. 4 schematically shows an installation for the electrochemical production of ammonium nitrate from a gaseous nitrogen source and using solid electrolyte, which comprises a high-temperature electrochemical cell, a reaction tank for the neutralization of excess nitric acid using ammonia, and an adsorption tower for the production of nitric acid according to another embodiment of the present disclosure.

In an embodiment shown in FIG. 4, an electrochemical cell based on solid electrolyte eliminates the liquid chamber for the production of ammonium nitrate. Solid oxygen-ion conductor 31 simultaneously serves as current carrier and separator. Ammonia is produced at the cathode side, and unreacted reactants are fed back to the cathode gas chamber 6 through a cathode gas-recycling channel 29. Nitrogen dioxide or nitrogen oxides with higher nitrogen valence are fed to an absorption tower 33 using water fed through a water channel 34. The resultant nitric acid is fed to the reaction tank 16 for the neutralization of ammonium through feeding channel 32. Unreacted anode reactants are fed back to the anode gas chamber through cathode gas-recycling channel 30.

Figure 5:
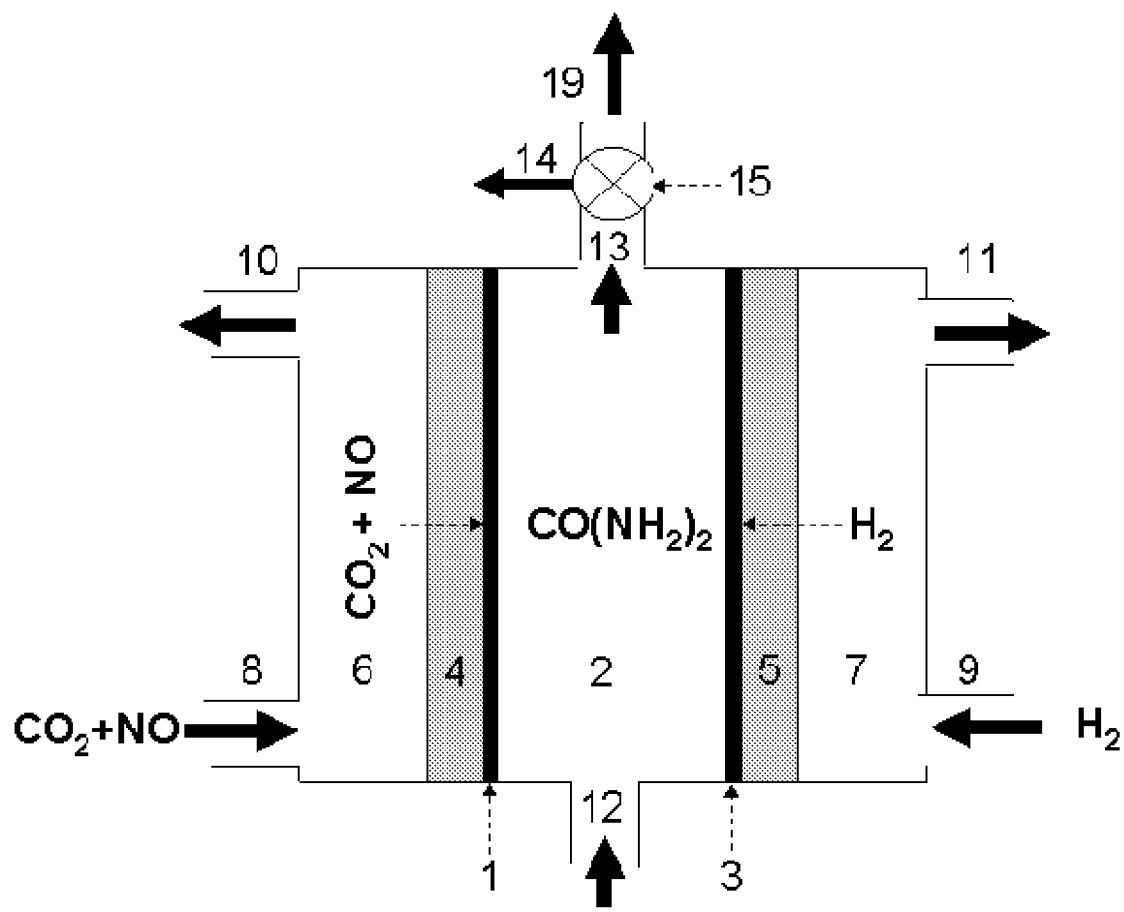
FIG. 5 schematically shows an electrochemical cell without membrane separator for the production of urea in liquid electrolyte using a gaseous nitrogen source, a gaseous carbon source, and a gaseous hydrogen source, according to another embodiment of the present disclosure.

In an embodiment shown in FIG. 5, an electrochemical cell comprising one liquid chamber and two gas chambers is used for the production of urea from a gaseous nitrogen source, gaseous carbon source and gaseous hydrogen or hydrogen equivalent source. Product urea dissolves in liquid electrolyte.

Figure 6:
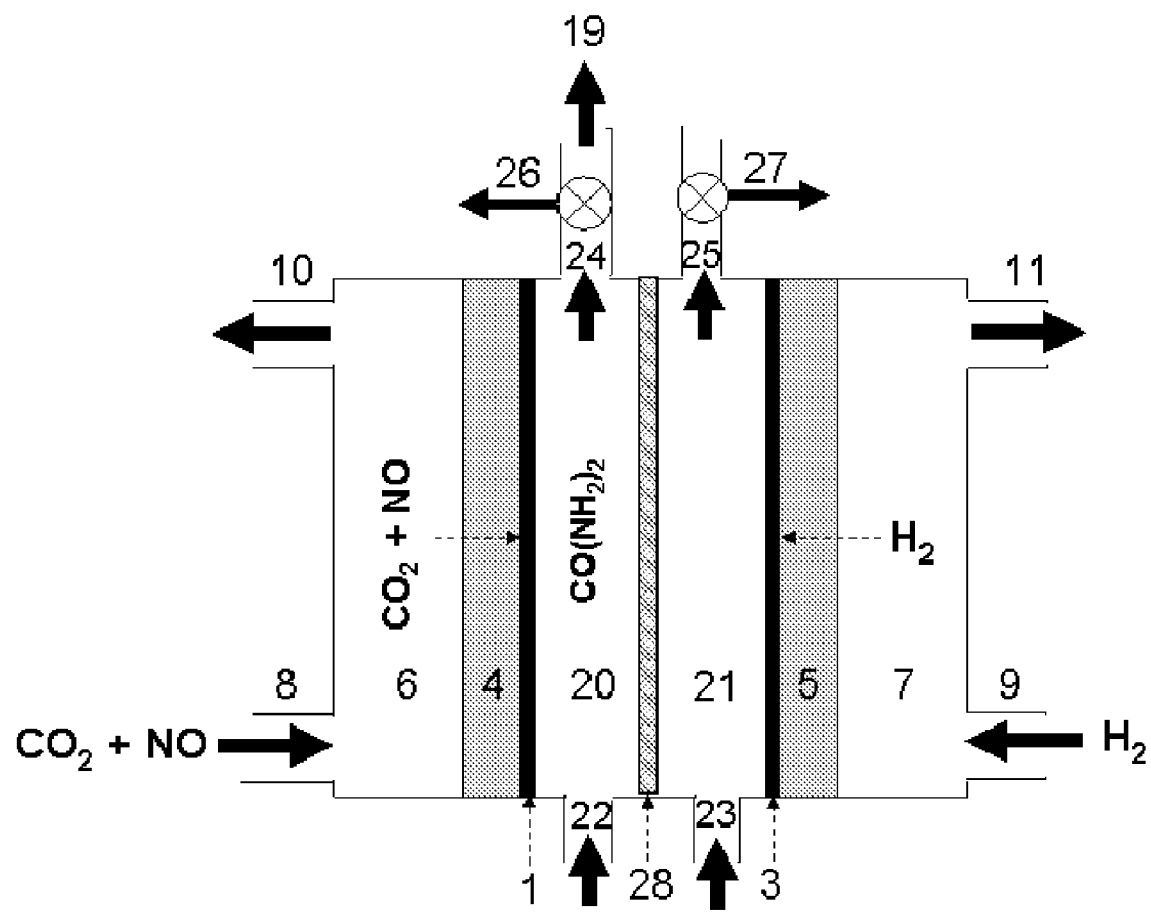
FIG. 6 schematically shows an electrochemical cell with membrane separator for the production of urea in liquid electrolyte using a gaseous nitrogen source, a gaseous carbon source, and a gaseous hydrogen source, according to another embodiment of the present disclosure.

In the embodiment shown in FIG. 6, an electrochemical cell with a membrane separator is used for the production of urea. Urea is produced at the cathode side and captured at the product outlet 19.

Figure 7:
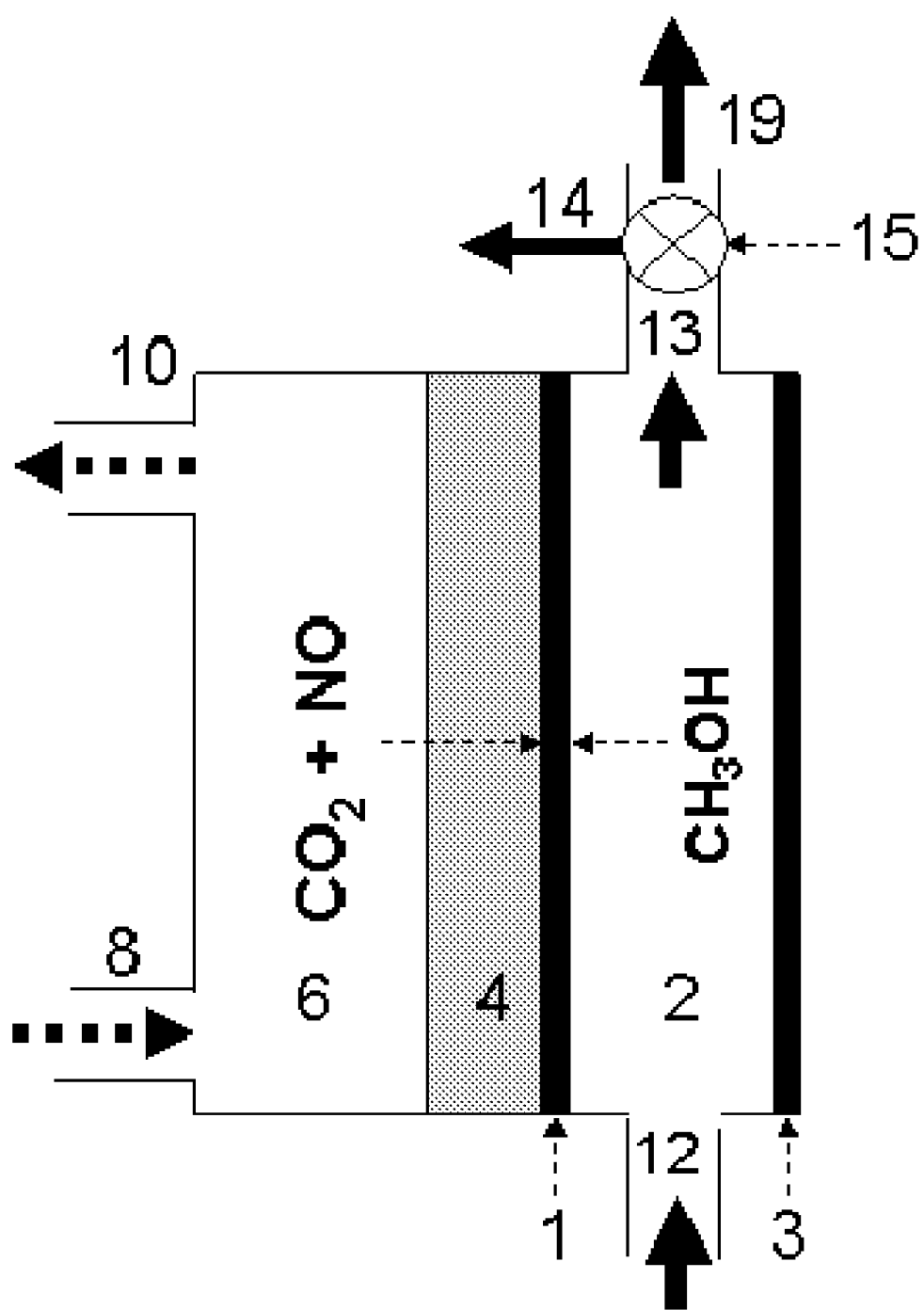
FIG. 7 schematically shows an electrochemical cell for the production of urea in liquid electrolyte using a gaseous nitrogen source, a gaseous carbon source, and a liquid hydrogen source, according to another embodiment of the present disclosure.

In the embodiment shown in FIG. 7, using liquid hydrogen source such as methanol in the production of urea obviates the need of an anode gas chamber 7 and a gas diffusion layer 5.

Figure 8:
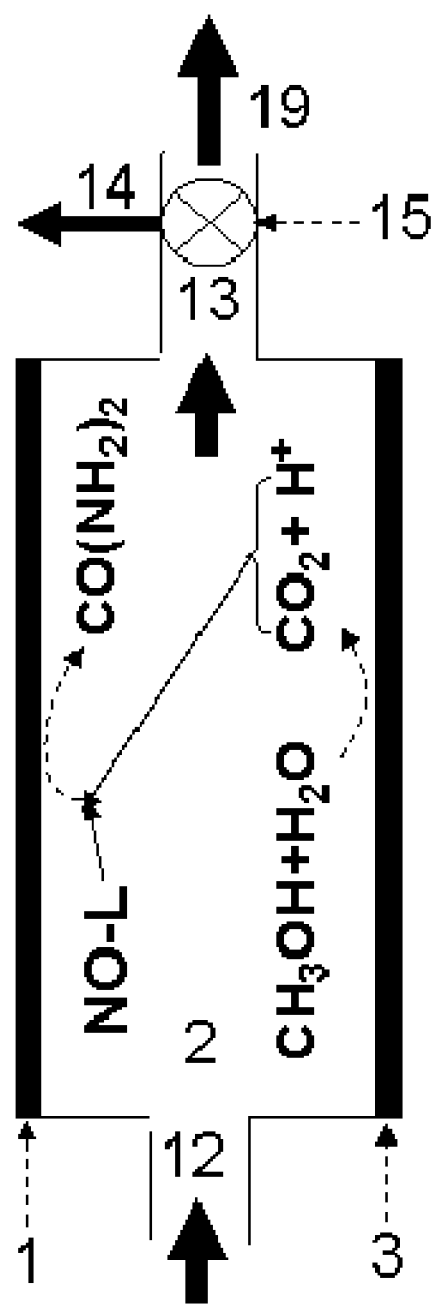
FIG. 8 schematically shows an electrochemical cell for the production of urea in liquid electrolyte using all liquid forms of a nitrogen source, a carbon source, and a hydrogen source, according to another embodiment of the present disclosure.

FIG. 8 schematically shows an electrochemical cell for the production of urea in liquid electrolyte using all liquid forms of a nitrogen source, a carbon source and a hydrogen or hydrogen equivalent source, according to some embodiments of the present disclosure.

Figure 9:
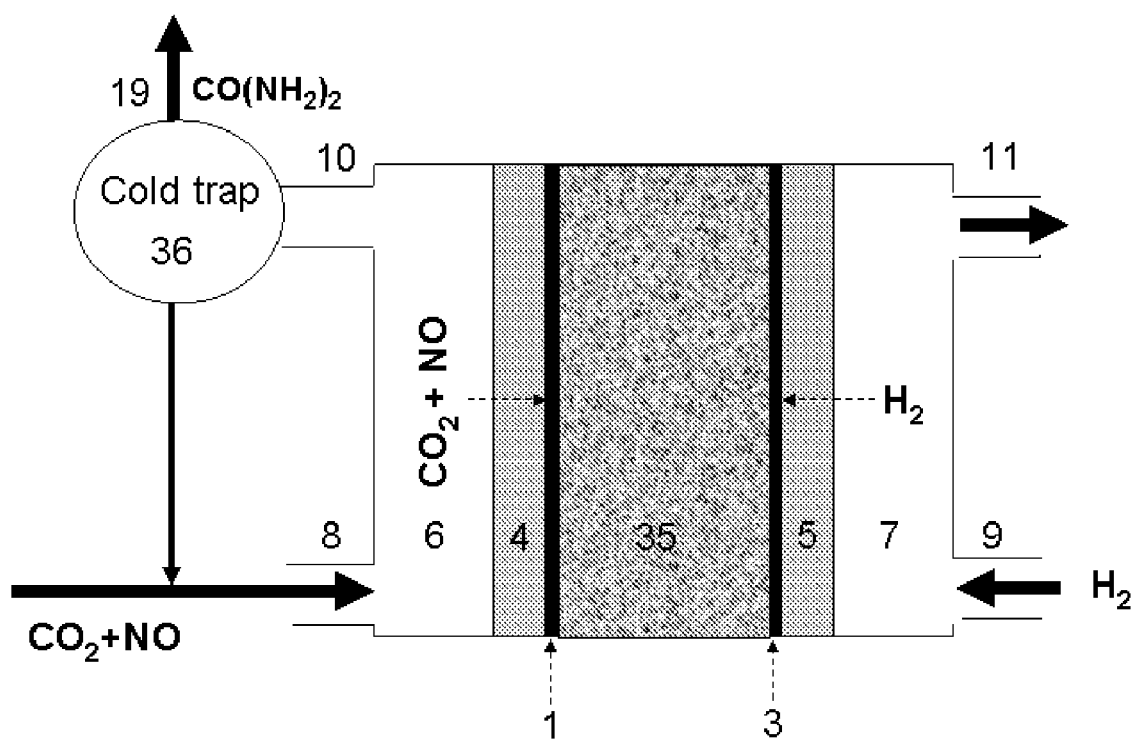
FIG. 9 schematically shows an installation for the electrochemical production of urea from a gaseous nitrogen source and using dense solid electrolyte, comprising a high-temperature electrochemical cell and a cold trap for the capture of reaction production of urea and/or isomers of urea according to one embodiment of the present disclosure.

In the embodiment of FIG. 9, an electrochemical cell is shown comprising a dense solid electrolyte as current-carrying layer and separator for the production of solid urea. The use of solid proton-conductor 35 allows high-temperature production of urea. Gaseous urea or its isodimer could be recovered as a solid using a cold trap 36.

Figure 10:
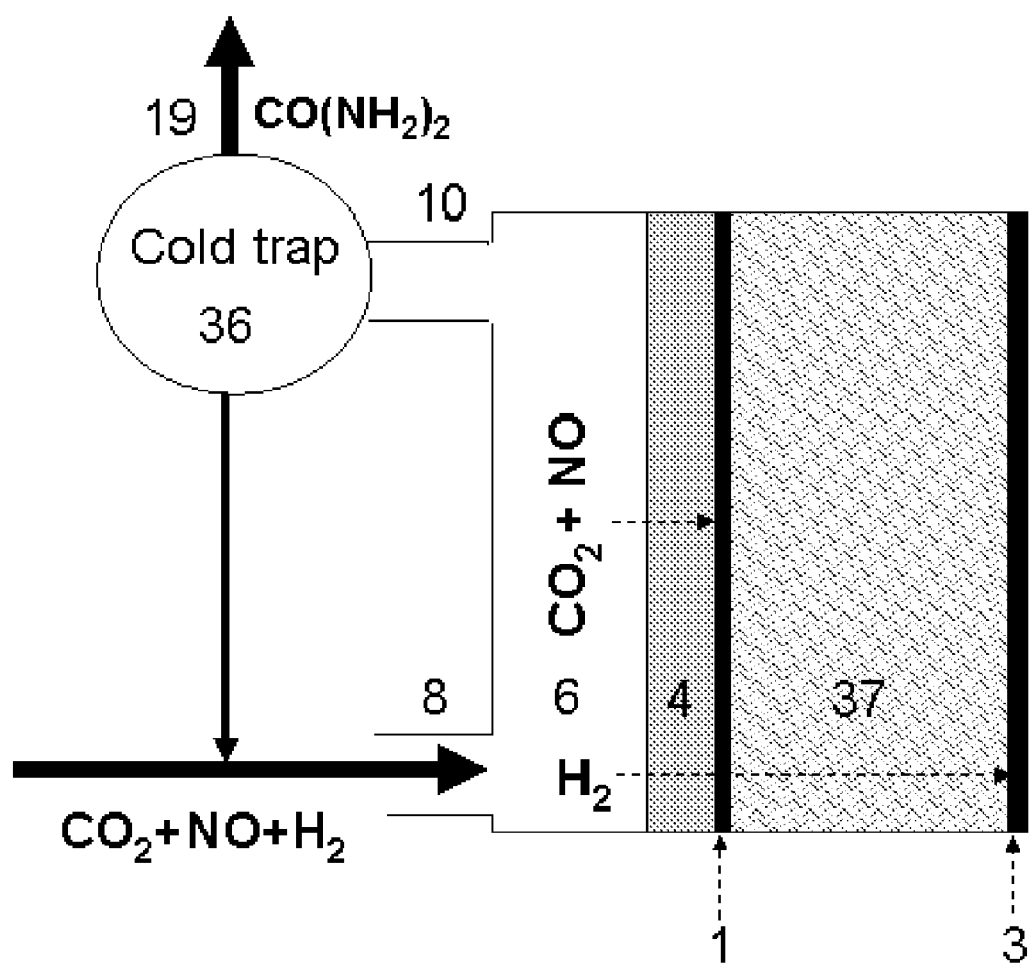
FIG. 10 schematically shows an installation for the electrochemical production of urea from a gaseous nitrogen source and using porous solid electrolyte, comprising a high-temperature electrochemical cell and a cold trap for the capture of reaction production of urea and/or isomers of urea according to one embodiment of the present disclosure.

In the embodiment shown in FIG. 10, an electrochemical cell uses a dense solid electrolyte as current-carrying layer for the production of solid urea. The use of selective anode and cathode electrocatalysts makes the production of urea in one gas chamber possible. In this embodiment, the electrochemical cell comprises a porous proton conductor 37.

Figure 11:
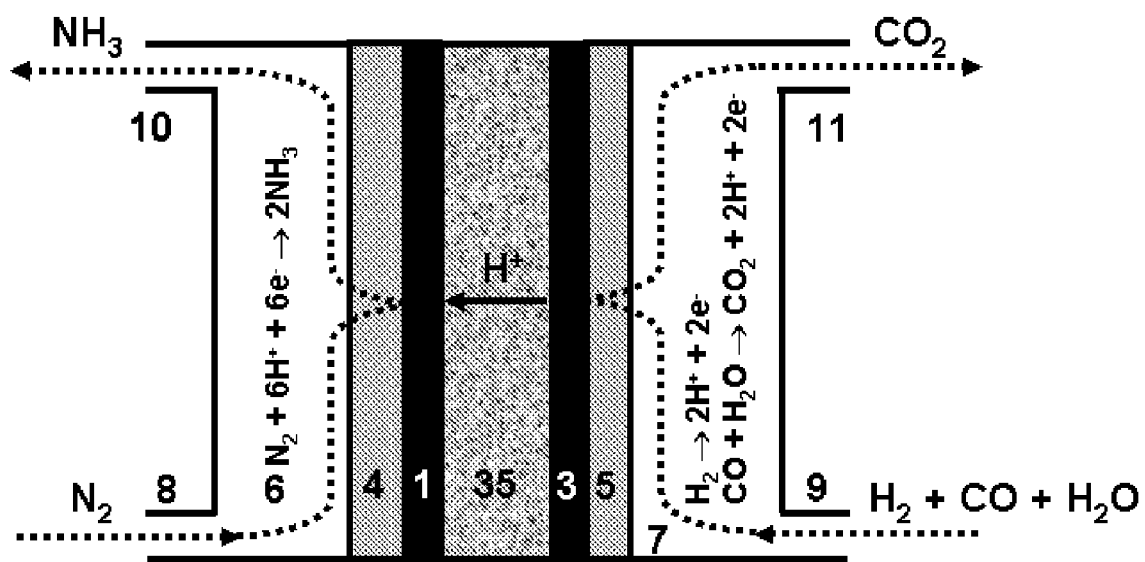
FIG. 11 schematically shows an electrochemical cell for the production of ammonia from a gaseous nitrogen source and a cost effective hydrogen or hydrogen equivalent source using proton conductive electrolyte, according to another embodiment of the present disclosure.

In the embodiment shown in FIG. 11, an electrochemical cell uses a proton-conductive electrolyte as a current-carrying layer for the production of ammonia. In this embodiment, ammonia is produced at cathode 1 by feeding humidified CO or a humidified mixture of $H_2$ and CO to anode 3.

Figure 12:
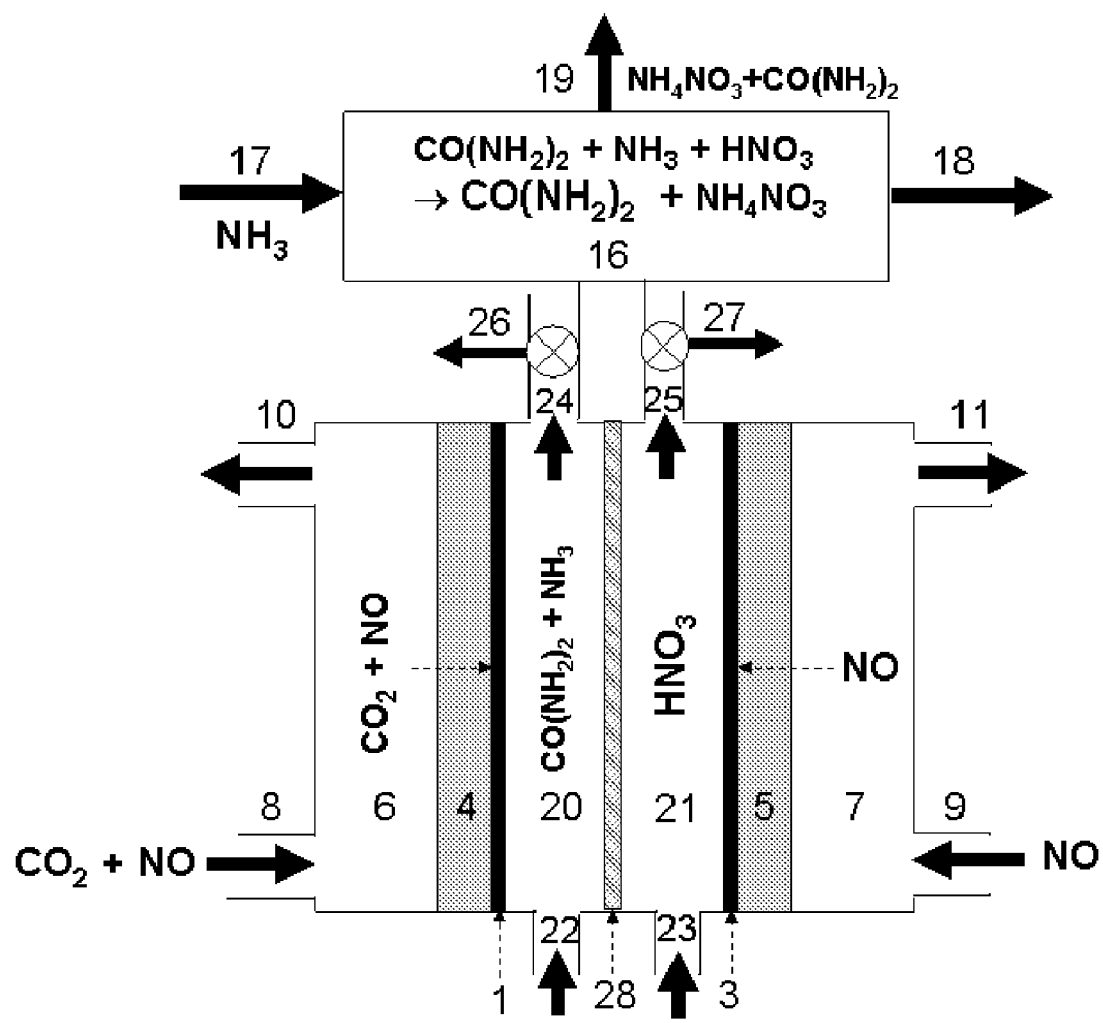
FIG. 12 schematically shows an installation for the electrochemical production of urea-ammonium nitrate from gaseous nitrogen source, which comprises an electrochemical cell with a membrane separator and a reaction tank for the neutralization of excess nitric acid using ammonia according to another embodiment of the present disclosure.

In one more embodiment shown in FIG. 12, an electrochemical cell with a membrane separator comprising two gas chambers and two liquid chambers makes the production of urea-ammonium nitrate possible. The mixture of ammonia and urea is produced in the cathode electrolyte phase, and nitric acid is produced in the anode electrolyte phase. Their neutralization of excess nitric acid using additional ammonia in a reaction tank 16 results in the formation of urea-ammonium nitrate.

Reactor

The apparatus herein disclosed for the electrochemical production of nitrogen fertilizers is optimized according to the scale of the fertilizer production application. For example, for micro- and small-scale applications, an electrochemical reactor with only one or two chambers may be used. For small- or middle-scale applications, a two- or three-chamber electrochemical reactor may be applicable. For large-scale applications, a three- to four-chamber reactor may be desirable. As mentioned, in embodiments, the electrochemical reactor comprises a single chamber comprising reactants, electrolyte, and electrodes. In other embodiments, the electrochemical reactor comprises one gas chamber, one liquid chamber, and two electrodes including at least one porous electrode. Yet other embodiments of the electrochemical reactor comprise three chambers, for example, two gas chambers and one liquid chamber, or one gas chamber and two liquid chambers. Further embodiments of the electrochemical reactor comprise four chambers, for example, two gas chambers and two liquid chambers.

As known to those of skill in the art, stacks may be used to scale up the production of nitrogen fertilizers. In these embodiments, several electrochemical cells of the present disclosure are connected in series or in parallel to increase the output production of nitrogen fertilizers.

Electrodes

The number of electrodes in the apparatus of the present invention depends on the scale of the urea production application. In embodiments, the apparatus comprises two electrodes, including one anode and one cathode. Alternatively, the apparatus comprises three or more electrodes, wherein at least one electrode is a cathode, at least one electrode is an anode, and at least one electrode is a reference electrode. In various embodiments, the electrodes of the apparatus comprise porous substrate, as further described hereinbelow. In embodiments, the porous substrate of the electrode(s) is electronically conductive. Suitable electronically conductive substrates include, for example, carbon-based materials, composites of carbon-based materials, and conductive metal oxides.

Anode and Cathode

In embodiments of the apparatus of the present disclosure, nitrogen fertilizers are produced through the use of an electrochemical cell, comprising electrodes. In embodiments, the apparatus comprises at least one anode. In embodiments, the at least one anode is nonporous. Alternatively, the at least one anode is porous. In embodiments, the at least one anode is partially wetted by electrolyte. Alternatively, the at least one anode is fully wetted by electrolyte. In embodiments, the apparatus comprises at least one cathode. In embodiments, the at least one cathode is nonporous. Alternatively, the at least one cathode is porous. In embodiments, the at least one cathode is partially wetted by electrolyte. Alternatively, the at least one cathode is fully wetted by electrolyte.

Catalysts

In embodiments, various metal catalysts are applied to the reaction layer of the electrode(s). The catalysts may be applied to the electrodes by any means to those of skill in the art. In embodiments, the catalysts are supported catalysts. Alternatively, the catalysts are unsupported catalysts. For example, solutions containing the various metal ion catalysts can be applied to the reaction layer, dried, and oxidized for a suitable time and for a suitable temperature, e.g. 1 hour at over 400 K. In embodiments, the reacting of the carbon source, the nitrogen source, and the hydrogen or hydrogen equivalent species to form nitrogen fertilizers takes place at the interface between the catalyst layer and the electrolyte. In embodiments, at least one catalyst is coated on at least the side of the porous cathode substrate facing the electrolyte. In embodiments, the catalyst layer is porous and has a porosity of from about 40% to about 90%, alternatively, the porosity is from 50% to about 80%. In embodiments, the catalyst layer is partially wetted by electrolyte solution. Alternatively, the catalyst layer is fully wetted by electrolyte solution. In embodiments, the catalyst layer comprises electrolyte.

In embodiments, at least a portion of the catalyst layer is electronically conductive. In embodiments, the apparatus comprises at least one conductive catalyst. Suitable electronically conductive catalysts include, for example, transition metals and alloys thereof, and conductive polymers, such as polyaniline and polythiophene. Alternatively, at least a portion of the catalyst layer is semi-conductive. Alternatively, at least a portion of the catalyst layer is non-conductive. Suitable semi-conductive and non-conductive catalysts include, by way of example, organic macromolecular compounds such as phthalocyanines and porphorines. In embodiments, semi-conductive or non-conductive catalysts are supported on carbon. Alternatively, semi-conductive or non-conductive catalysts are supported on conductive metal oxides. In embodiments, the catalysts are powdery. In embodiments, the catalysts have an equivalent particle size of from 1 nm to 1 mm, alternatively from 1 nm to 1000 nm, alternatively from 2 nm to 50 nm. In embodiments, the anode catalysts are preferably supported platinum-based catalysts. Alternatively, the anode catalysts are unsupported platinum-based catalysts. Alternatively, the anode catalysts are unsupported or supported nickel or nickel-based alloy catalysts, especially for the electrolytic nitrogen fertilizer process operated at elevated temperature.

Membrane

In embodiments, the apparatus comprises at least one membrane separating the anode and the cathode. The membrane may serve to substantially separate reactants and products on the anode and cathode sides of the reactor. Suitable membranes include, for example, organic and inorganic ion-exchange membranes, porous polymer membranes, inorganic porous membranes and other porous membranes and combinations thereof, as known to those of skill in the art. In embodiments, the membrane separator has a pore size of from 1 nm to 100 µm, alternatively from 10 nm to 10 µm, alternatively from 50 nm to 1 µnm.

Electrolyte

In embodiments, the electrolytic reactor of the present disclosure comprises an electrolyte. In embodiments, the electrolyte comprises an aqueous solution. Suitable aqueous electrolytes comprise, for example, inorganic acids, alkaline salts dissolved in water, neutral salts dissolved in water, alkaline salts dissolved in a mixture of water and an organic solvent, neutral salts dissolved in a mixture of water and an organic solvent, and combinations thereof. Alternatively, the electrolyte comprises a nonaqueous solution. Suitable nonaqueous electrolytes comprise organic salts dissolved in organic solvents, molten acids, alkalines and salts, ionic liquids, and combinations thereof. Still alternatively, the electrolyte is a solid. Suitable solid electrolytes comprise polymer electrolytes, inorganic solid electrolytes, and combinations thereof.

Carbon Source

In embodiments, the electrochemical process herein described for the production of urea and urea-ammonium nitrate comprises a carbon source. In embodiments, the carbon source is a readily available and economically desirable source. In various embodiments, the carbon source comprises a carbon-containing organic compound, a carbon-containing gas, or a combination thereof. In embodiments, for example small- to large-scale applications, the carbon source is carbon dioxide. Suitable sources for carbon dioxide include, by way of example only, ethanol plants, fermentation plants, coal combustion systems, gasification processes of carbon-containing sources, such as coal, biomass, municipal solid waste (MSW), petcoke, heavy oils, and refinery residues, adsorption systems, scrubbing systems, the reforming of natural gas, and amine systems. The carbon dioxide source may be physical or chemical gas treatment units (Selexol, Rectisol, Purisol, and amine scrubbers) in refineries, gasification, or synthesis gas plants. In embodiments, the source of carbon comprises impurities.

Nitrogen Source

In embodiments, the electrochemical process herein described for the production of nitrogen fertilizers comprises a nitrogen source. In embodiments, the nitrogen source is a source that is more economically desirable than nitrate or nitrite. In embodiments, the nitrogen source is capable of being electrochemically reduced at more positive electric potential relative to the electrochemical reduction of nitrite or nitrate. In this case, the energy consumption for the electrochemical process is decreased, and the process is more economically favorable.

In embodiments wherein the nitrogen source is other than nitrate or nitrite, the nitrogen source utilized simplifies the separation and purification of product nitrogen fertilizers from the electrolyte. In embodiments, the nitrogen source utilized is one that contributes to the "greenhouse effect" and the formation of acid rain, and thus the use of this nitrogen source for the preparation of nitrogen fertilizers converts an environmentally harmful component into a beneficial product, such as, for example, fertilizer. Suitable nitrogen sources include, without limitation, nitrogen-containing salts, nitrogen-containing gases, and combinations thereof. Preferably, the nitrogen source is a nitrogen-containing gas. In embodiments, the nitrogen-containing species is a nitrogen oxide, $N_xO_y$, where x=1 or 2 and y=0, 1, 2, 3, 4, or 5. Suitable sources of $N_xO_y$ include coal combustion plants, coal gasification processes, biomass gasification processes, electric air discharge processes, combustion of protein-containing feedstocks (e.g., distiller's grain coproduct of a fermentation ethanol process), combustion of a nitrogen-rich feedstock, and combinations thereof. In one embodiment, the present invention attains the above advantages by using NO as the nitrogen source. In embodiments, the source of nitrogen comprises impurities.

Molar Ratio of C Source to N Source

In embodiments, the apparatus of the present disclosure comprises a nitrogen source and a carbon source. In embodiments, the molar ratio of the carbon source to the nitrogen source in the reactants during the urea production spans the range from 0.1 to 20, alternatively from about 0.5 to about 5, alternatively from about 5 to about 10.

Hydrogen or Hydrogen Equivalent Source

In embodiments, the electrochemical process herein described for the production of nitrogen fertilizers includes a hydrogen or hydrogen equivalent source. In embodiments, the hydrogen source is a source that is economically desirable. In embodiments, the hydrogen source comprises a hydrogen-containing salt component. Suitable hydrogen-containing salt components are, by way of example only, ammonium hydroxide ($NH_4OH$) and sodium borohydride ($NaBH_4$). Alternatively, the hydrogen source comprises a hydrogen-containing compound. Suitable hydrogen-containing compounds are, for example, water, alcohols, and sugars. Alternatively the hydrogen source comprises a hydrogen-containing gas. Suitable hydrogen-containing gases are, for example, $H_2$ and $NH_3$. Hydrogen equivalents include carbon monoxide and mixtures of carbon monoxide and hydrogen. In embodiments, the selection of the hydrogen source is based on the scale of the nitrogen fertilizers production application. Exemplarily, for micro-, small-, and middle-scale applications a hydrogen-containing compound may be a preferable hydrogen source. For large-scale applications, hydrogen gas generated from the gasification of coal or biomass or from the reforming of natural gas may be more economically competitive than a hydrogen-containing compound. Other suitable sources of hydrogen gas comprise the electrolysis of water, the electrolysis of alcohols, the electrolysis of sugar, preferably wherein the electricity is generated from wind energy or solar energy. Other suitable sources of hydrogen gas comprise the electrolysis of sulfur dioxide utilizing waste heat from a power plant. Sources of hydrogen equivalents include syngases produced via gasification of fossil fuels or biomass or reforming of methane and other hydrogen-containing gases, and carbon monoxide produced via combustion of fossil fuels or biomass.

Electricity

In embodiments, the reaction is carried out at a constant current. Alternatively, the reaction occurs at a constant potential. Alternatively, the reaction occurs in a current-pulse mode. Still alternatively, the reactor may be run in a potential-scanning mode. For the production of urea in embodiments comprising an electrochemical reactor without a reference electrode, the process can be operated by applying a constant current or repetitive current pulse through the cathode and the anode sides. The amount of urea produced is increased with increasing reaction time. For higher selectivity and/or current efficiency for the production of nitrogen fertilizers, the electrochemical reactor may comprise a reference electrode to control the reaction potential at the cathode side. This potential may, in embodiments, be constant and changed in a selected range at a controlled rate.

Methods

In embodiments, nitrogen fertilizers are produced by providing an electrolyte between an anode and a cathode, providing a source of nitrogen, a source of carbon, and/or a source of hydrogen or hydrogen equivalent, and providing electricity to drive anodic and cathodic reactions whereby the carbon source and the nitrogen source are reduced at the cathode, hydrogen species are produced at the anode, and the carbon species, the nitrogen species, and the hydrogen-containing species react at the cathode to form the product. In embodiments, the nitrogen source and the carbon source are provided to the cathode side and the hydrogen or hydrogen equivalent source is supplied to the anode to form hydrogen-containing species at the anode-electrolyte interface. In embodiments, the nitrogen source can be provided to both the cathode and anode sides for the production of ammonium nitrate. In embodiments, the nitrogen source and the carbon source are provided to the cathode side, and the nitrogen source is provided to the anode side for the production of urea-ammonium nitrate. In embodiments, the carbon source is a carbon-containing gas, the nitrogen source is a nitrogen-containing gas, and the method further comprises delivering the carbon-containing gas and the nitrogen-containing gas through the porous substrate. Alternatively, the hydrogen or hydrogen equivalent source is supplied to the electrolyte to provide hydrogen-containing species, the hydrogen-containing species passes through the electrolyte to the cathode, wherein the hydrogen-containing species reacts with the nitrogen-containing and carbon-containing species to form urea. Alternatively, the nitrogen source is supplied to the electrolyte for the cathode reduction, the carbon source is supplied to the electrolyte for the cathode reduction, or a combination thereof.

Rate of Feed

The reactants (gas and liquid) may be fed to the reactor at any rates known to those of skill in the art. Alternatively, the feeding rate of the gaseous species is 0 SCCM (standard cubic centimeters per minute) to about 10,000 SCCM. Alternatively, the feeding rate of the liquid species or electrolyte is 0 mL/min to 10,000 mL/minute.

Temperature of Reaction

In embodiments, the reaction is carried out at a temperature of from about 0° C. to about 600° C., alternatively at a temperature of from about 0° C. to about 100° C., alternatively from about 200° C. to about 600° C. For the processes using liquid electrolyte, the reaction temperature is preferably controlled over 0° C. to 100° C. For the processes using solid electrolyte, the reaction temperature could be in a range of 200° C. to 600° C. In embodiments, the reaction temperature is not limited to 0° C. to 600° C.

Pressure of Reaction

In embodiments, the reaction is carried out at a pressure of from about 1 atmosphere to about 200 atmospheres, alternatively at a pressure of from about 1 atmosphere to about 50 atmospheres, alternatively from about 1 atmosphere to about 10 atmospheres.

Removal of $O_2$ Gas

To enhance the economic desirability and production of urea, in embodiments of the present method, oxygen gas or an oxidation product formed at the anode may be removed from the reactor and used to monetary advantage.

Recycle of Unused Reactants

To enhance the economic desirability of the method herein disclosed for the production of urea, the method may further comprise product separation and subsequent recycle of components such as unused reactants and electrolyte.

EXAMPLES

Example 1

According to an embodiment of the present disclosure, a one-chamber electrochemical cell was studied for the production of ammonium nitrate. In this case, depicted in FIG. 1, the reactor comprises cathode catalyst 1, for example, powdery Cu, and anode catalyst 3, for example, Pt black with E-TEK® gas diffusion electrodes being as both cathode gas diffusion layer 4 and anode gas diffusion layer 5. A solution of 0.2 mol $dm^{-3}$ $K_2SO_4$ in water fills the electrolyte chamber 2 and remains stationary. The cathode potential is controlled at −0.23 V vs. a Ag/AgCl reference electrode. High-purity NO gas is provided to the cathode camber 6 through the cathode gas inlet 8 and to the anode chamber 7 through the cathode inlet 9. After 30 min of electrolysis, the current efficiency for the formation of nitrate group produced at the anode side is around 90%, and the current efficiency for the formation of ammonium group produced at the cathode is around 50%. This indicates that the product produced inside the reactor comprises ammonium nitrate with excess of nitric acid, which could be neutralized in the reaction tank 16 using ammonia. In the production of ammonium nitrate, no hydrogen source is used.

Example 2

In an electrochemical cell having two gas chambers and one liquid chamber, as shown in FIG. 5, mixed gases of $CO_2$ and NO with an appropriate ratio were fed into the gas chamber at the cathode side. An aqueous solution of 0.5 mol $dm^{-3}$ $K_2SO_4$ was pumped through the electrolyte chamber at a rate of 5 mL mind, and pure hydrogen gas was fed into the gas chamber at the anode side. The electrochemical reaction was operated at a constant current mode with 20 mA $cm^{-2}$. Zinc (Zn) was used as the cathode catalyst, and carbon-supported platinum (Pt) was used as the anode catalyst. The cell voltage was around 0.7 V. The production of urea was confirmed in the aqueous electrolyte. The molar ratio of urea to its reaction coproduct in the aqueous electrolyte (ammonia) was about 3:7.

Example 3

According to an embodiment of the present disclosure, a one-chamber electrochemical cell was studied for the production of urea. In this embodiment, depicted in FIG. 7, the reactor comprises cathode catalyst 1, for example, Zn, and anode catalyst 3, for example, a PtRu alloy. A solution comprising water, methanol, and 0.5 mol $dm^{-3}$ $K_2SO_4$ is pumped through the electrolyte inlet 12 into the electrolyte chamber 2, and the gaseous and liquid phases meet at the gas-liquid interface 7. The nitrogen source, nitric oxide, enters the reactor through gas inlet 8 and exits the reactor through gas outlet 10. Nitric oxide diffuses through gas diffusion layer 4 to the cathode 1. At the anode side, methanol is oxidized to hydrogen-containing species, proton, and carbon dioxide. Both carbon dioxide and proton diffuse to the cathode side and are then reduced together with nitric oxide (NO) to form urea. The use of methanol as a hydrogen source for the urea process may be advantageous compared to the use of hydrogen gas as a hydrogen source in terms of availability, storage, and transportation, especially for micro to middle-scale urea production.

Example 4

In an electrochemical cell having two gas chambers separated using a porous ceramic membrane filled with a molten electrolyte of mixed metal chlorides, $N_2$ gas was fed into the gas chamber at the cathode side with nickel as the cathode catalyst. At the anode side with nickel as the anode catalyst, a humidified gas of carbon monoxide (CO) was studied as a gaseous hydrogen source fed to the gas chamber, versus pure $H_2$ gas as the hydrogen source. Ammonia was detected in the reaction products in both cases and the current efficiencies for the formation of ammonia were very close.

While preferred embodiments of this invention have been shown and described, modifications thereof can be made by one skilled in the art without departing from the scope or teaching of this invention. The embodiments described herein are exemplary only and are not limiting. Many variations and modifications of the apparatus and method are possible and are within the scope of the invention. Accordingly, the scope of protection is not limited to the embodiments described herein, but is only limited by the claims which follow, the scope of which shall include all equivalents of the subject matter of the claims.

What is claimed is:

1. A method for producing fertilizers comprising:
feeding gaseous reactants comprising at least one nitrogen source and a source of hydrogen selected from the group consisting of a hydrogen-containing salt, a hydrogen-containing compound, and a hydrogen-containing gas to a reactor, the reactor including at least one reaction chamber, at least one anode, at least one cathode, and at least one electrolyte between each at least one anode and each at least one cathode;
providing electricity to drive anodic and cathodic reactions, and
producing a fertilizer having nitrogen by providing a nitrogen source of the at least one nitrogen source to the at least one cathode and a nitrogen source of the at least one nitrogen source to the at least one anode.

2. The method of claim 1 wherein the hydrogen-containing salt is selected from the group consisting of ammonium hydroxide ($NH_4OH$) and sodium borohydride ($NaBH_4$).

3. The method of claim 1, wherein the anodic and cathodic reactions are carried out at a temperature in the range of from about 0° C. to about 1000° C.

4. The method of claim 1 wherein the reactants further comprise at least one carbon source and the at least one nitrogen source, and wherein the molar ratio of the carbon source to the at least one nitrogen source in the reactants changes from 0.1 to 20 during an electrochemical reaction.

5. The method of claim 1 wherein at least one anode comprises at least one catalyst selected from the group consisting of precious metals, alloys of precious metals, supported counterparts thereof, and combinations thereof.

6. The method of claim 1 comprising at least two reactors forming a stack.

7. The method of claim 1 further comprising reacting ammonia and nitric acid in a reaction tank connected to the reactor.

8. The method of claim 1 further comprising converting, in an absorption tower, oxides of nitrogen with high valance into nitric acid by contacting the oxides with water.

9. The method of claim 1 wherein the fertilizer comprises urea, the at least one electrolyte, is solid, and the reactor is a high-temperature electrochemical cell.

10. The method of claim 1 further comprising using a cold trap to capture urea or an isomer of urea.

11. The method of claim 1 wherein the anodic and cathodic reactions are carried out at a constant current mode, a constant potential mode, a current-pulse mode, or a potential-scanning mode.

12. A method for producing fertilizers comprising:
feeding gaseous reactants comprising at least one nitrogen source to a reactor, the reactor including at least one reaction chamber, at least one anode, at least one cathode, and at least one electrolyte between each at least one anode and each at least one cathode wherein the at least one electrolyte comprises an aqueous solution;
providing electricity to drive anodic and cathodic reactions, and
producing a fertilizer having nitrogen by providing a nitrogen source of the at least one nitrogen source to the at least one cathode and a nitrogen source of the at least one nitrogen source to the at least one anode.

13. A method for producing fertilizers comprising:
feeding gaseous reactants comprising at least one nitrogen source and a source of hydrogen selected from the group consisting of a hydrogen-containing salt, a hydrogen-containing compound, and a hydrogen-containing gas to a reactor, wherein the hydrogen-containing salt is selected from the group consisting of ammonium hydroxide ($NH_4OH$) and sodium borohydride ($NaBH_4$), the reactor including at least one reaction chamber, at least one anode, at least one cathode, and at least one electrolyte between each at least one anode and each at least one cathode;
providing electricity to drive anodic and cathodic reactions, and
producing a fertilizer having nitrogen by providing a nitrogen source of the at least one nitrogen source to the at least one cathode and a nitrogen source of the at least one nitrogen source to the at least one anode.

14. A method for producing fertilizers comprising:
feeding gaseous reactants comprising at least one nitrogen source and a source of hydrogen selected from the group consisting of hydrogen-containing salt, a hydrogen-containing compound, and a hydrogen-containing gas to a reactor, wherein the hydrogen-containing salt is selected from the group consisting of ammonium hydroxide ($NH_4OH$) and sodium borohydride ($NaBH_4$), the reactor including at least one reaction chamber, at least one anode, at least one cathode, and at least one electrolyte between each at least one anode and each at least one cathode, wherein the at least one electrolyte comprises an aqueous solution;
providing electricity to drive anodic and cathodic reactions, and
producing a fertilizer having nitrogen by providing a nitrogen source of the at least one nitrogen source to the at least one cathode and a nitrogen source of the at least one nitrogen source to the at least one anode.

* * * * *